(12) United States Patent
Fenske et al.

(10) Patent No.: US 11,655,739 B2
(45) Date of Patent: May 23, 2023

(54) DEVICE FOR SEPARATING PARTICLES FROM A GAS FLOW, PARTICLE SEPARATOR AND CRANKCASE VENTILATION SYSTEM

(71) Applicant: WOCO Industrietechnik GmbH, Bad Soden-Salmünster (DE)

(72) Inventors: Sebastian Fenske, Gelnhausen (DE); Marcus Rüttger, Steinau an der Straße (DE); Martin Klingelhöfer, Hanau (DE)

(73) Assignee: WOCO Industrietechnik GmbH, Bad Soden-Salmuenster (DE)

( * ) Notice: Subject to any disclaimer, the term of this patent is extended or adjusted under 35 U.S.C. 154(b) by 399 days.

(21) Appl. No.: 16/593,433

(22) Filed: Oct. 4, 2019

(65) Prior Publication Data
US 2020/0109650 A1  Apr. 9, 2020

(30) Foreign Application Priority Data
Oct. 5, 2018 (DE) .......................... 102018124647.1

(51) Int. Cl.
*F01M 13/04* (2006.01)
*F16K 1/52* (2006.01)

(52) U.S. Cl.
CPC ............. *F01M 13/04* (2013.01); *F16K 1/523* (2013.01); *F01M 2013/0438* (2013.01)

(58) Field of Classification Search
CPC ........... F01M 13/04; F01M 2013/0438; F01M 13/0011; F01M 2013/027; F16K 1/523
See application file for complete search history.

(56) References Cited

U.S. PATENT DOCUMENTS

| 5,228,424 A * | 7/1993 | Collins ................ F01M 13/023 |
| | | 123/574 |
| 10,156,168 B2 * | 12/2018 | Hashimoto ............ B01D 45/16 |
| 2003/0075046 A1* | 4/2003 | Lenzing ............... F02M 35/022 |
| | | 95/267 |

(Continued)

FOREIGN PATENT DOCUMENTS

| DE | 10 2004 049 089 A1 | 4/2006 |
| DE | 20 2005 009 990 U1 | 11/2006 |

(Continued)

OTHER PUBLICATIONS

Office Action dated Sep. 25, 2019 for German Patent Application No. 10 2018 124 647.1 (German language only) (14 pp.).

*Primary Examiner* — Kurt Philip Liethen
(74) *Attorney, Agent, or Firm* — Banner & Witcoff Ltd.

(57) ABSTRACT

A device separates particles such as oil particles from a gas flow, from a blow-by gas of a crankcase ventilation, in an internal combustion engine. The device includes a valve seat that defines a flow passage opening and a movable valve element that can be displaced between a closed position, in which the valve element is in abutting contact with the valve seat and the abutting contact defines an axial abutting point, and at least one open position, in which the valve element is moved from the axial abutting point in an axial actuating direction, wherein at least one abutting contact surface of the valve element and/or the valve seat is contoured in such a way that a fluid passage is allowed in the closed position.

21 Claims, 9 Drawing Sheets

(56) References Cited

U.S. PATENT DOCUMENTS

| | | | | |
|---|---|---|---|---|
| 2009/0199826 | A1* | 8/2009 | Meinig | F01M 13/04 |
| | | | | 123/573 |
| 2010/0101425 | A1* | 4/2010 | Herman | F01M 13/0011 |
| | | | | 55/447 |
| 2013/0105009 | A1* | 5/2013 | Oda | F01M 13/0011 |
| | | | | 137/517 |
| 2014/0182716 | A1* | 7/2014 | Yamada | F16K 15/026 |
| | | | | 137/535 |
| 2015/0345349 | A1* | 12/2015 | Monros | F01M 13/04 |
| | | | | 123/574 |
| 2016/0138442 | A1* | 5/2016 | An | F01M 13/021 |
| | | | | 123/559.1 |
| 2017/0314432 | A1* | 11/2017 | Dwivedi | F01M 13/0011 |

FOREIGN PATENT DOCUMENTS

| | | |
|---|---|---|
| DE | 10 2008 044 857 A1 | 8/2010 |
| DE | 20 2010 001 191 U1 | 6/2011 |
| DE | 10 2010 029 322 A1 | 12/2011 |
| DE | 20 2016 104 363 U1 | 12/2017 |
| DE | 10 2017 119 833 A1 | 2/2019 |
| WO | WO 2011/089006 A1 | 7/2011 |
| WO | WO 2016/184768 A1 | 11/2016 |

\* cited by examiner

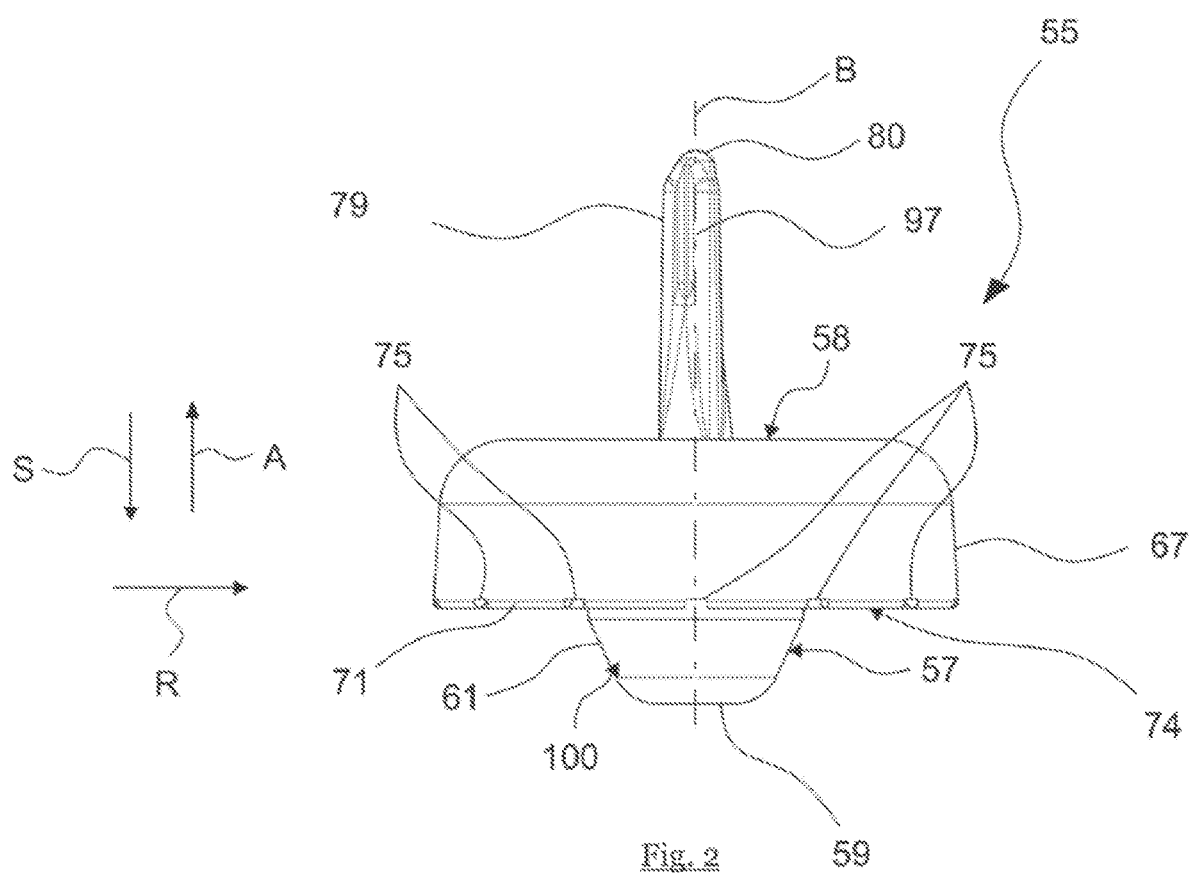

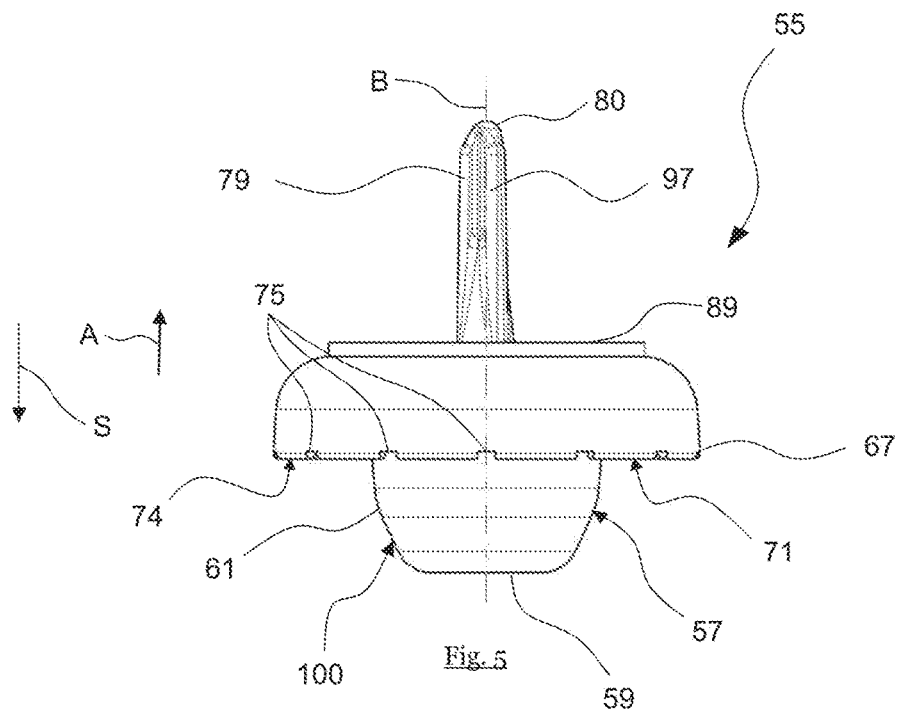
Fig. 5
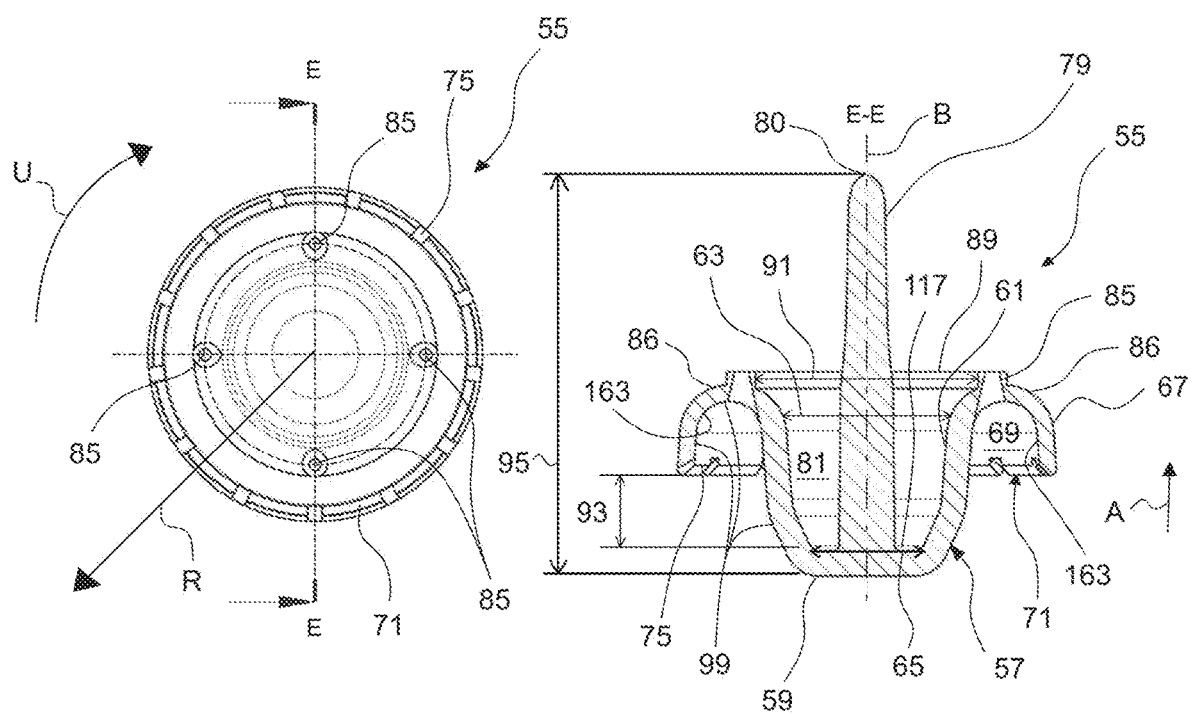
Fig. 6
Fig. 7

DEVICE FOR SEPARATING PARTICLES FROM A GAS FLOW, PARTICLE SEPARATOR AND CRANKCASE VENTILATION SYSTEM

RELATED APPLICATION

This application claims the benefit and priority of German Patent Application DE 10 2018 124 647.1, filed Oct. 5, 2018, which is incorporated by reference herein in its entirety.

TECHNICAL FIELD

The present embodiments relate to a device for separating particles from a gas flow with a blow-by gas of a crankcase ventilation, in an internal combustion engine. The particles may be oil particles. The embodiments further relate to a particle separator with at least two corresponding devices for separating particles from a gas flow, such as from a blow-by gas of a crankcase ventilation, in an internal combustion engine. The embodiments also include a crankcase ventilation system of an internal combustion engine.

BACKGROUND

Separators, particularly oil separators, are generally known from the prior art. There generally exist two types of separators, namely active separators and passive separators. Active separators are characterized in that additional energy is expended for acting upon the particles, particularly oil particles, in order to achieve a higher separation efficiency. In a known electric separation system, for example, particles are electrically charged such that they are attracted by an antipolar surface and subsequently can be separated. In passive separators, no additional energy is introduced into the system. For example, passive separators utilize the kinetic energy of the gas flow. In this case, the particles are conveyed, for example, through a labyrinth or a cyclone such that they can be separated from the gas flow due to their mass inertia, wherein the particles can thereby be removed from the gas flow, which is subsequently cleaned. In oil separators, the oil particles particularly are returned into the oil circuit and the cleaned gas flow is returned into the intake air of the internal combustion engine.

DE 20 2010 001 191 discloses an oil separation valve, in which a spring-loaded valve disk interacts with a stationary valve seat that defines an opening for the passage of a gas flow. In this case, gas passage openings are provided in the disk and also allow a gas flow through the valve seat opening in the closed state of the oil separation valve in order to thereby make available a liquid separation function. However, such separating devices have the disadvantage that the separation effect of such gas passage openings, particularly number of potential gas passage openings, is limited.

SUMMARY

The present invention is based on the objective of rectifying the disadvantages of the prior art, particularly by making available a separator for separating particles from a gas flow, a particle separator and a crankcase ventilation system, in which the separation rate is significantly improved in the open position of the valve element, as well as in its closed position.

Accordingly, a device for separating particles such as oil particles from a gas flow, from a blow-by gas of a crankcase ventilation, in an internal combustion engine is proposed. An inventive device for separating particles is also simply referred to as separating device below. The term oil separator or oil separating device would be appropriate for the specific use in the separation of oil particles. In an exemplary application of an inventive separator in a motor vehicle with an internal combustion engine, blow-by gases occurring between a working piston and a cylinder, in which the working piston is accommodated, accumulate in a crankcase interior of the internal combustion engine. So-called blow-by gases alternatively also occur between the cylinder and the cylinder head and/or between the cylinder head and a cylinder head cover of an internal combustion engine, e.g. a reciprocating piston engine. Blow-by gases typically not only contain air and oil, but also combustion gases and unburnt fuel components that may have negative effects on the function of the internal combustion engine. For example, the pressure increase in the crankcase caused by the blow-by gas flow is reduced or prevented, by means of a crankcase ventilation that is coupled to the fresh air supply of the internal combustion engine by means of a pipe system. An inventive separating device may be arranged, for example, within the crankcase ventilation along the flow direction, particularly in such a way that the blow-by gas flow containing the combustion gases and/or unburnt fuel components is fed to the separating device, in which a separation, particularly oil separation, of particles such as oil particles takes place, wherein the separated particles can thereby be discharged separately of the gas flow and the cleaned gas flow can be fed to the fresh air supply without damages to the internal combustion engine. The inventive separating devices are passive separating devices, in which no additional energy is introduced into the separating system as already described above.

The inventive separating device comprises a valve seat that defines a flow passage opening. In this case, the valve seat has to be arranged relative to the gas flow in such a way that the gas flow can at least partially flow through the flow passage opening. The separating device defines a separation space, which is respectively located downstream of the valve element or the flow passage opening and into which the gas flow can flow through the flow passage opening. For example, a side of the valve seat facing the gas flow may have the shape of a planar plate. The flow passage opening can extend through the valve seat continuously from the side that faces the gas flow to a side that faces away from the gas flow and faces the separation space. For example, the flow passage opening has an angular, oval, round shape, or a circular shape.

The inventive separating device furthermore comprises a movable valve element. In this case, the valve element can be displaced between a closed position, in which the valve element is an abutting contact with the valve seat, and at least one open position, in which the valve element is released from the abutting contact and moved in an axial actuating direction. The abutting contact may define an axial abutting point, wherein the term axial should be interpreted with respect to the axial actuating direction. When the valve element moves from an open position into the closed position, i.e. into the abutting contact with the valve seat that is defined by the axial abutting point, the valve element carries out an axial motion in an axial closing direction that extends opposite to the axial actuating direction. This closing direction essentially extends parallel and opposite to the axial actuating direction, wherein the axial actuating direction and the axial closing direction may generally be referred to as axial direction, but with opposite orientation. The term open position particularly refers to the position of the valve element relative to the valve seat, in which the valve element and the valve seat are not in abutting contact, i.e. in which the valve element is not located at the abutting point.

According to one embodiment, at least one abutting contact surface of the valve element and/or the valve seat is contoured in such a way that a fluid passage is allowed in the closed position. In this case, the respective surfaces of the valve element and the valve seat, which are in abutting contact in the axial abutting point, may form at least one abutting contact surface. Due to the contouring of the abutting contact surface, i.e. the surface that respectively is in contact with the valve seat or the valve element in the closed position of the valve element in order to actually prevent the fluid from flowing through the flow passage opening, the gas flow is also able to reach the separation space through the flow passage opening in the closed position of the valve element in order to also ensure a separation effect to a certain degree in the closed position. The efficiency of the separating device can thereby be significantly enhanced. For example, the flow passage opening and the valve element essentially are realized rotationally symmetrical and/or essentially arranged coaxial to one another. In this case, a dimension of the valve element in a radial direction extending transverse, particularly perpendicular, to the axial direction, i.e. the axial actuating direction or the axial closing direction, is greater than a corresponding dimension of the flow passage opening. For example, the valve element has a disk-like shape, wherein the disk particularly may have a circumferential collar section, which comes in abutting contact with the valve seat, on its radially outer side.

The at least one abutting contact surface of the valve element and/or the valve seat is not limited to a certain structure, but rather may have an arbitrary contour as long as it is ensured that a fluid passage is possible in the closed position. For example, the abutting contact surface of the valve seat and the abutting contact surface of the valve element may be adapted to one another with respect to their shape in such a way that a fluid passage is allowed in the closed position.

According to an exemplary embodiment of the inventive separating device, the contouring of the at least one abutting contact surface of the valve element and/or the valve seat comprises at least one projection and/or at least one depression. For example, the at least one projection and/or the at least one depression may cause the inventive effect that the facing abutting contact surfaces of the valve element and the valve seat do not abut on one another in a completely contacting manner, in which case a fluid passage would be prevented, but rather are at least sectionally not in contact with one another, particularly along a circumference viewed in the axial direction, in order to ensure the fluid passage. According to an example embodiment, the at least one projection and/or the at least one depression is realized linearly and/or essentially extends perpendicular to the axial direction. A group of multiple projections and/or a group of multiple depressions particularly may be arranged on the at least one abutting contact surface of the valve element and/or the valve seat such that they are uniformly distributed in the circumferential direction with respect to the axial actuating direction. For example, two adjacent depressions or projections respectively are equidistantly spaced apart from one another.

According to an exemplary embodiment of the inventive separating device, an at least sectionally circumferential gap exists between the valve element and the valve seat in the closed position. In other words, the valve element and the valve seat, particularly the facing abutting contact surfaces of the valve element and the valve seat, are at least sectionally not in contact with one another in the circumferential direction.

According to an exemplary enhancement of the inventive separating device, a gap extent in the circumferential direction and/or a gap dimension in the axial direction is dimensioned in dependence on a predefined leakage gas volume flow to be adjusted. It should be clear that different leakage gas volume flows may be desirable depending on the respective place of installation and field of application of the inventive separating device. The allowed leakage gas volume flow can be limited by means of predefined gap dimensions to be adjusted in the circumferential direction, as well as in the axial direction. The valve element may be mounted movably relative to the valve seat in the axial direction in such a way that the valve element is in the closed position in a non-actuated state of the separating device. A certain leakage gas volume flow through the flow passage opening is allowed as soon as the gas flow impinges upon the separating device. In this case, the gas flow exerts a pressure, which particularly depends on the gas flow velocity, upon the valve element in the axial actuating direction, wherein the weight of the valve element counteracts the pressure of the gas flow. As soon as the pressure of the gas flow overcomes the force that holds the valve element in the closed position, the weight of the valve element, the valve element is moved from the closed position, i.e. the abutting point, into an open position in the axial actuating direction in order to allow an increased gas flow through the flow passage opening and to prevent an increased dynamic pressure.

According to an exemplary embodiment of the inventive separating device, the at least one abutting contact surface comprises an inflow edge, which is arranged upstream, and a flow outlet edge, which is arranged downstream. For example, a fluid passage channel, which extends from the inflow edge to the flow outlet edge and is formed by the contouring, is realized in a curved manner, particularly in order to deflect and/or guide the gas flow. The fluid passage channel may be curved, for example, in such a way that particles separate from the gas flow due to the impact of the particles of the gas flow on flow guide surfaces of the fluid passage channel, which are realized, for example, by a wall forming the fluid passage channel. In this way, an increased separation rate or enhanced separation efficiency of the inventive separating device can be achieved.

In an exemplary embodiment of an inventive separating device, a spring, a coil spring, pretensions the valve element into the closed position in the axial direction, such as in the closing direction, particularly opposite to the axial actuating direction. For example, the spring may be supported on the valve element and cause a displacement of the valve element into the closed position. The spring may be designed, for example, in such a way that it is in an non-actuated, undeformed idle state or pretensioned, particularly pre-deformed, to a certain extent in the closed position of the valve element such that a spring force acts upon the valve element in the axial closing direction continuously, i.e. also in the closed position, wherein this makes it possible, in particular, to adjust and/or improve the response characteristic of the valve element. The term response characteristic generally refers to the responsiveness of the valve element to gas pressure fluctuations.

According to an embodiment, a spring constant is chosen in such a way and/or a fluid passage surface, which is oriented or extends perpendicular to the axial actuating direction and is formed as a result of the contouring in the closed position, is dimensioned, particularly with respect to an overall inflow surface of the valve element, in such a way that a fluid passage volume up to 20 l/min, particularly 30 l/min, 40 l/min, 50 l/min or 60 l/min, is ensured in the closed position before the valve element is displaced from the closed position in the axial actuating direction. The term overall inflow surface of the valve element may refer, for example, to the surface of the valve element that can come in contact with the impinging gas flow, i.e. can be impinged upon by this gas flow. The spring therefore exerts a spring force, which is oriented opposite to the pressure of the fluid flow and presses the valve element into the closed position, wherein said spring force particularly holds the valve element in the closed position until the pressure exerted by the gas flow overcomes this spring force. In this context, the fluid passage volume allowed up to this point defines the leakage gas flow volume in the closed position. The leakage volume flow to be adjusted or made possible by means of the described circumstances accordingly can be scaled and adapted to the respective place of installation or field of application of the inventive separator. For example, it is advantageous to respectively realize a fast or sensitive response characteristic of the valve element. It may also be desirable that an increased spring force acts upon the valve element if the valve element has greater amplitudes of motion in the axial actuating direction.

In an exemplary embodiment of the inventive separating device, the spring may have a progressive spring constant and/or an additional spring may be arranged in series with the spring in the axial actuating direction. For example, the at least one spring may be progressively coiled. The at least one spring and the at least one additional spring may be arranged in series in the axial direction in such a way that the upstream spring near the valve element has a lower spring constant than the downstream spring. The spring near the valve element particularly is supported on the valve element and the downstream spring is supported on the spring near the valve element and/or on a housing part such as a cover of the separating device, which lies opposite of the valve seat.

Alternatively or additionally, the spring constant may increase linearly or exponentially. In addition to the use of progressively coiled springs and a serial arrangement of springs, it would also be possible to arrange multiple springs in parallel for this purpose. However, it proved advantageous to use a spring with progressively coiled spring core and/or a serial arrangement of springs with different spring constants and to place the spring or springs over the guide pin because an additional space requirement in the radial direction for multiple springs arranged in parallel can thereby be prevented. With respect to the progressive spring characteristic, it proved advantageous to choose the progression in such a way that the spring constant increases as the valve element is displaced in the actuating direction. In this way, it can particularly be ensured that the valve element is also displaced from the closed position into an open position at a low fluid pressure of the gas flow, but the maximal open position is only reached at high fluid pressures. In comparison with a spring that has a constant spring characteristic and, in particular, the same overall axial extent, the response characteristic of the valve element can thereby be adapted over a greater fluid pressure range of the gas flow.

In another embodiment, the device comprises a multipart housing, wherein the housing particularly has an inflow housing part that contains the flow passage opening and a cover part that can be connected to the inflow housing part, and wherein the valve element and the spring are supported in the housing and/or wherein the housing parts are connected to one another by means of a clip connection and/or wherein the housing, particularly the inflow housing part, can be connected to the crankcase by means of a tongue-and-groove connection. The inflow housing part and the valve seat are realized integrally.

The housing particularly defines a separation space, wherein the gas flow particularly flows into this separation space through the flow passage opening and out of said separation space through separating nozzles. Embodiments of these separating nozzles are described further below. The separation space particularly comprises a flow space between the valve seat and the inflow housing part, particularly the valve element, and/or a bypass space between the valve element and the cover part. The flow space and the bypass space are connected by at least one leakage opening in the valve element, by contouring an abutting contact point of the valve seat and/or valve element, particularly the abutting point, and/or by the passage opening between the valve seat and the valve element in an open position. The flow space is also referred to as gap between the valve seat and the valve element below.

The inflow housing part is designed for being fastened on a gas flow source with a gas outlet opening, particularly on a crankcase. The gas flows from the gas outlet opening of the gas flow source into the flow passage opening of the valve seat, which particularly is realized integrally with the inflow housing part. The inflow housing part comprises an annular recess, particularly an annular space, which extends in the actuating direction, especially radially outside the flow passage opening, wherein said annular space particularly is closed in the actuating direction and open in the closing direction. The annular space, which is open in the closing direction, particularly protrudes beyond the abutting point in the actuating direction.

The cover part particularly comprises the passage opening for the guide pin and/or the supporting point for the spring on the housing side. At least one emergency ventilation opening, especially just one emergency ventilation opening, particularly may be provided in the cover part.

Gas flows particularly can be discharged from the separating device and/or from a gas flow source such as a crankcase through the emergency ventilation opening in case of a blockage of the valve element and/or the valve seat, e.g. due to icing, such that especially the ventilation function of the separating device is preserved. The emergency ventilation opening particularly makes it possible to bypass the flow space and/or the bypass space and to discharge the gas flow past the valve element and/or the valve seat through the emergency ventilation opening. In this case, the gas flow enters the housing through the inflow housing part and exits the housing through the emergency ventilation opening, wherein the entry into the inflow housing part particularly takes place via a bypass, and wherein the gas flow particularly does not pass the flow passage opening of the valve seat. The emergency ventilation opening in the cover part extends radially inward and/or outward beyond the radial web and/or beyond the abutting point. With respect to the circumferential direction, the emergency ventilation opening particularly extends about the rotational axis of symmetry of the valve element and/or the valve seat over 10° to 150°, or over 20° to 120°, including over 30° to 90°. The radial web particularly is interrupted at the circumferential position of the emergency ventilation opening, especially by providing a bypass passage opening in the housing inflow part, in order to thereby form a bypass for the gas flow in the housing inflow part. The emergency ventilation opening is realized in the form of annular sections or angularly, particularly quadrangular.

In an exemplary enhancement of the inventive separating device, at least one separating nozzle, which has a constant through-flow cross section, is arranged downstream of the valve element for the nebulization and/or defined discharge of the gas flow. The separating nozzle may form at least one gap in the separation space or be realized in the form of such a gap. The separating nozzle may be realized in the form of a so-called static nozzle, wherein particularly the gap cross section and therefore the through-flow cross section of the separating nozzle essentially are constant regardless of the position of the valve element. The separating nozzle is arranged downstream of the abutting contact between the valve element and the valve seat. For example, the separating nozzle may be realized by a housing part that lies opposite of the valve seat, e.g. a cover, and by the valve seat. The housing part and the valve seat may be adapted to one another with respect to their shape and/or arranged relative to one another in such a way that an essentially constant gap, by means of which a particle separation is realized, is in the installed state of the separating nozzle formed downstream of the abutting contact between the housing part and the valve seat during the operation. In an open position, for example, a flow cross section between the valve element and the valve seat at the abutting point lies in the range between 90% and 200%, such as in the range between 100% and 180%, particularly in the range between 120% and 170%, of a through-flow cross section of the separating nozzle, wherein 100% refers to identical cross-sectional areas. A clear flow cross section, which defines a radially oriented clear cross-sectional area, exists between the valve seat and the valve element in an open position, wherein this clear cross-sectional area particularly changes along the flow direction, i.e. in the axial direction, and the gas flow reaches the separation chamber through said clear cross-sectional area past the valve seat and the valve element, particularly through the flow passage opening of the valve seat. The gas flow can be accelerated along a pressure gradient between the separating nozzle inlet opening and the separating nozzle outlet opening in order to thereby enhance the separating efficiency of the inventive separating device.

According to another embodiment, a device for separating particles such as oil particles from a gas flow, with a blow-by gas of a crankcase ventilation, in an internal combustion engine is proposed. This embodiment can be combined with the preceding embodiments.

Accordingly, a device for separating particles such as oil particles from a gas flow, from a blow-by gas of a crankcase ventilation, in an internal combustion engine is proposed. An inventive device for separating particles is also simply referred to as separating device below. The term oil separator or oil separating device would be appropriate for the specific use in the separation of oil particles. In an exemplary application of an inventive separator in a motor vehicle with an internal combustion engine, blow-by gases occurring between a working piston and a cylinder, in which the working piston is accommodated, accumulate in a crankcase interior of the internal combustion engine. So-called blow-by gases alternatively also occur between the cylinder and the cylinder head and/or between the cylinder head and a cylinder head cover of an internal combustion engine, e.g. a reciprocating piston engine. Blow-by gases typically not only contain air and oil, but also combustion gases and unburnt fuel components that may have negative effects on the function of the internal combustion engine. For example, the pressure increase in the crankcase caused by the blow-by gas flow is reduced, or prevented, by means of a crankcase ventilation that is coupled to the fresh air supply of the internal combustion engine by means of a pipe system. An inventive separating device may be arranged, for example, within the crankcase ventilation along the flow direction, particularly in such a way that the blow-by gas flow containing the combustion gases and/or unburnt fuel components is fed to the separating device, in which a separation, particularly oil separation, of particles such as oil particles takes place, wherein the separated particles can thereby be discharged separately of the gas flow and the cleaned gas flow can be fed to the fresh air supply without damages to the internal combustion engine. The inventive separating devices are passive separating devices, in which no additional energy is introduced into the separating system as already described above.

The inventive separating device comprises a valve seat that defines a flow passage opening. In this case, the valve seat has to be arranged relative to the gas flow in such a way that the gas flow can at least partially flow through the flow passage opening. The separating device defines a separation space, which is respectively located downstream of the valve element or the flow passage opening and into which the gas flow can flow through the flow passage opening. For example, a side of the valve seat facing the gas flow may have the shape of a planar plate. The flow passage opening can extend through the valve seat continuously from the side that faces the gas flow to a side that faces away from the gas flow and faces the separation space. For example, the flow passage opening has an angular, oval or round shape, including a circular shape.

The inventive separating device furthermore comprises a movable valve element. In this case, the valve element can be displaced between a closed position, in which the valve element is an abutting contact with the valve seat, and at least one open position, in which the valve element is released from the abutting contact and moved in an axial actuating direction. The abutting contact may define an axial abutting point, wherein the term axial should be interpreted with respect to the axial actuating direction. When the valve element moves from an open position into the closed position, i.e. into the abutting contact with the valve seat that is defined by the axial abutting point, the valve element carries out an axial motion in an axial closing direction that extends opposite to the axial actuating direction. This closing direction essentially extends parallel and opposite to the axial actuating direction, wherein the axial actuating direction and the axial closing direction may generally be referred to as axial direction, but with opposite orientation. The term open position particularly refers to the position of the valve element relative to the valve seat, in which the valve element and the valve seat are not in abutting contact, i.e. in which the valve element is not located at the abutting point.

The separating device furthermore comprises at least one leakage element such as a leakage projection or a leakage depression, particularly a gas passage opening for allowing a fluid passage in the closed position. The at least one leakage element may be arranged, for example, on the valve seat and/or on the valve element. The at least one leakage element particularly is not located on one of the abutting contact surfaces of the valve seat and/or the valve element that come into abutting contact with one another.

According to this embodiment, the valve element has a rotationally symmetrical bowl upstream of the gas flow, wherein said bowl axially protrudes past the valve seat opposite to the axial actuating direction, particularly by at least 5 mm, especially by at least 10 mm, or by at least 10%, 20%, 30%, 40% or 50% of the longitudinal extent of the valve element, particularly the overall longitudinal extent of the valve element. The inventive separating device is particularly advantageous for applications, in which little structural space, particularly little axial structural space, is available because the overall axial extent of the separating device can be kept small despite the high separation rate. Since the bowl of the valve element protrudes in the closing direction, the gas flow already impinges upon the valve element upstream of the axial abutting point between the valve element and the valve seat such that a particle separation by means of the inventive separating device is already achieved before the gas flow reaches the axial abutting point and the overall separation rate is thereby increased. The bowl particularly has a bowl base that protrudes past the abutting point opposite to the axial actuating direction, i.e. in the closing direction, by at least 5 mm, particularly by at least 10 mm, or by at least 10%, 20%, 30%, 40% or 50% of the longitudinal extent of the valve element. It is furthermore advantageous to use a spring, which causes a motion of the valve element in the closing direction and is supported on the valve element with one axial end. This supporting point of the spring on the valve element, such as on the bowl, particularly on the bowl base, may be arranged in the axial direction, particularly in the closing direction, in such a way that the supporting point of the spring likewise protrudes past the abutting point in the closing direction. Consequently, the available spring travel can be significantly increased without increasing the overall axial extent of the separating device in the axial direction. The at least one leakage element allows a fluid passage for realizing the leakage gas volume flow in the closed position. The preceding explanations with respect to the contouring of the abutting contact surfaces applies analogously to the at least one leakage element.

In an exemplary embodiment of the inventive separating device, the at least one leakage element is arranged on the bowl, such as on a base of the bowl that essentially extends perpendicular to the axial actuating direction. This ensures that a leakage gas volume flow, which can reach the separating device in order to be subjected to a particle separation therein, is formed as early as possible.

In another embodiment of the invention, the valve seat forms a rotationally symmetrical hollow body, which particularly is shaped complementary to the bowl. The hollow body particularly is tapered in a closing direction extending opposite to the actuating direction, wherein the bowl particularly can be telescopically displaced into the actuating position and the closed position inside the hollow body. Alternatively or additionally, the hollow body guides the valve element during a displacement in the actuating direction and the closing direction and/or the hollow body defines the flow passage opening. The hollow body and/or the shell of the bowl initially extend in the closing direction in an essentially cylindrical manner and is then tapered in the radial direction, particularly in the shape of a funnel. The radially outer surfaces of the bowl, particularly the shell, and the radially inner surfaces of the valve element, particularly the hollow body, especially form flow guide surfaces, along which the particle-laden gas flow flows between the valve element and the valve seat. The cylindrical section and/or the tapered section of the hollow body and the shell are shaped complementary to one another in such a way that a gap with essentially constant gap width is formed between the shell and the hollow body in the closed position. The gap between the shell and the hollow body initially extends in the closing direction in an essentially cylindrical manner and is then tapered in the radial direction, particularly in the shape of a funnel. The gap width between the shell and the hollow body particularly is increased by displacing the valve element in the actuating direction. During a displacement of the valve element in the actuating direction and in the closing direction, this valve element particularly is displaced into and out of the hollow body in a telescopic manner. Depending on the respective embodiment, the gap width in the closed position can be increased or decreased. The flow resistance to the gas through-flow increases as the gap width decreases and vice versa. A reduction of the gap width particularly makes it possible to enhance the guiding function of the valve seat relative to the valve element.

In an exemplary enhancement of the inventive separating device, the at least one leakage element is realized in the form of a drainage element. The at least one leakage element is realized in such a way that a fluid return such as a drainage, particularly of separated particles, through the at least one leakage element is possible opposite to the axial actuating direction. As a result, it is possible to prevent an increased accumulation of separated particles in the separation space, which could also lead to a reduced separation efficiency of the separating device.

According to another embodiment, which can be combined with the preceding embodiments, a particle separator is made available. The particle separator comprises at least two devices for separating particles such as oil particles from a gas flow, from a blow-by gas of a crankcase ventilation, in an internal combustion engine. In this case, the at least two separating devices particularly are realized in accordance with the separating devices described with reference to the preceding embodiments.

The at least two devices respectively comprise a valve seat that defines a flow passage opening and a movable valve element. The valve element can be displaced between a closed position, in which the valve element is in abutting contact with the valve seat and the abutting contact may define an axial abutting point, and at least one open position, in which the valve element is moved from the axial abutting point in an axial actuating direction.

The at least two devices particularly are fluidically connected to one another in such a way that a gas flow can be divided between the two devices upstream of the particle separator and/or a gas flow can flow from one device into the other device. For example, the at least two devices may be arranged parallel to one another, wherein parallel should be interpreted in such a way that a gas flow impinging upon the particle separator can flow into both of the at least two devices, for example be divided between the two devices. The inventive arrangement of the at least two devices, particularly in an inventive particle separator, makes it possible to significantly increase the separation rate. Since the gas flow exiting one device can after the particle separation in this device flow into the other of the at least two devices for another particle separation, the resulting gas flow is significantly cleaner and can subsequently be returned, for example, to the fresh air supply of the internal combustion engine.

With respect to other exemplary embodiments of the separating devices, we refer to the preceding embodiments as examples, which may likewise apply in this context.

According to another embodiment, a crankcase ventilation system of an internal combustion engine is made available. Generic crankcase ventilation systems typically serve for preventing a pressure increase within the crankcase, which particularly results from blow-by gases from the combustion cycle of the internal combustion engine. The crankcase ventilation system comprises a crankcase with a flow outlet opening, through which the blow-by gas can exit the crankcase. For example, a pipeline system may be connected to the flow outlet opening of the crankcase. According to the invention, the crankcase ventilation system comprises a device that is fluidically connected to the flow outlet opening and serves for separating particles such as oil particles from the blow-by gas, wherein the separating device is realized in accordance with one of the preceding or example embodiments.

BRIEF DESCRIPTION OF THE DRAWINGS

Other properties, advantages and characteristics of the invention can be gathered from the following description of preferred embodiments of the invention with reference to the attached exemplary drawings, in which:

FIG. 2 shows a side view of a first embodiment of a valve element for a separating device;

FIG. 3b shows a detail III of FIG. 3a;

FIG. 4 shows a section through the valve element according to FIG. 2 along the line of section D-D in FIG. 3a;

FIG. 5 shows a side view of a second embodiment of a valve element for a separating device;

FIG. 6 shows a bottom view of the valve element according to FIG. 5;

FIG. 7 shows a section through the valve element according to FIG. 5 along the line of section E-E in FIG. 6;

DETAILED DESCRIPTION

In the following description of exemplary embodiments, an inventive device for separating particles is also simply referred to as separating device and generally identified by the reference symbol 51. The separating device as a whole is described in detail with reference to FIG. 10, which shows an inventive particle separator that is generally identified by the reference symbol 53.

Figure 1:
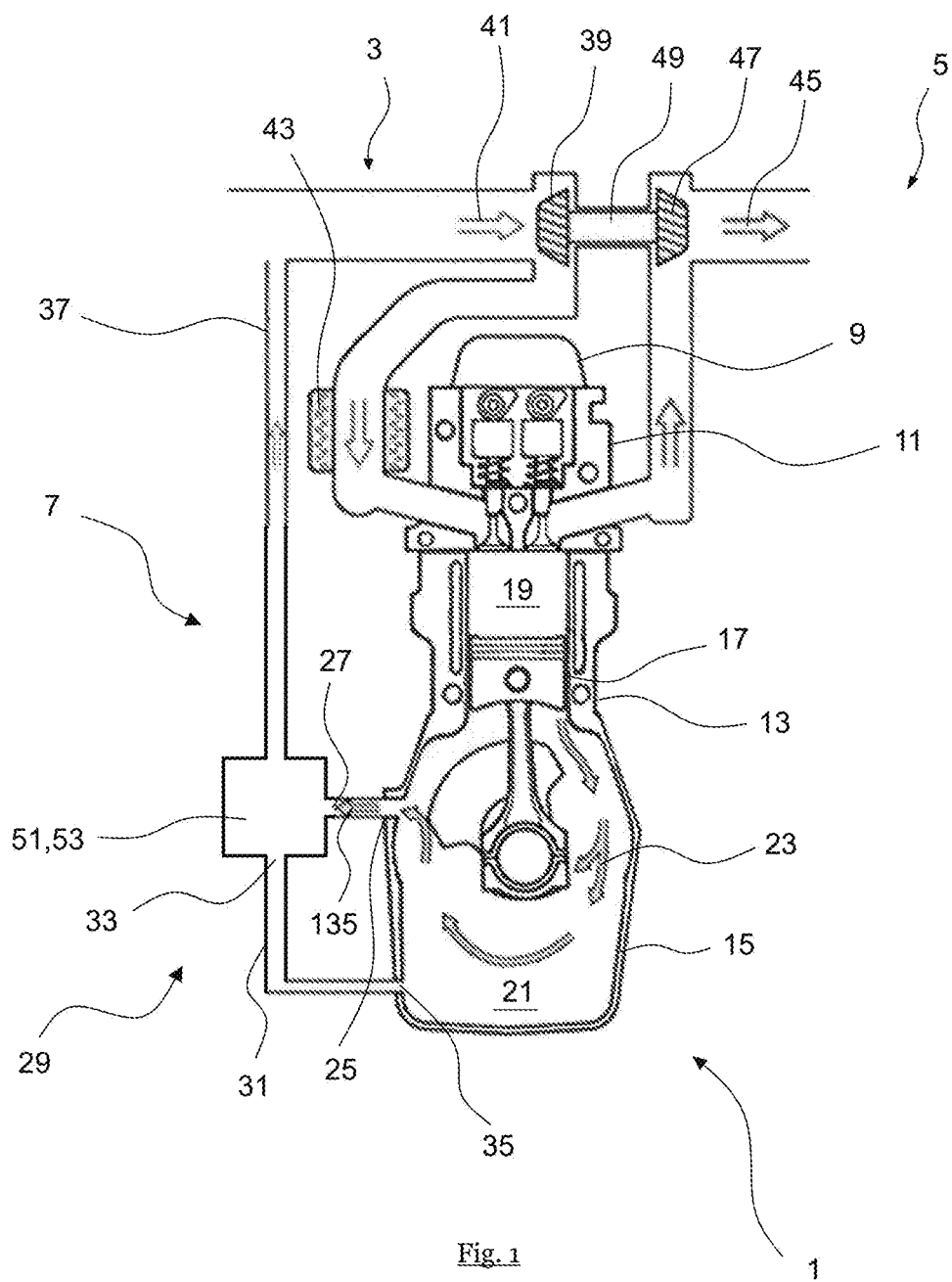
FIG. 1 shows an inventive crankcase ventilation system in the form of a schematic diagram of an example of the formation of blow-by gases and of the installation position of inventive separating devices and particle separators.

FIG. 1 shows an embodiment of an inventive crankcase ventilation system of an internal combustion engine, which is identified by the reference symbol 29 below. The crankcase ventilation system 29 comprises a crankcase 15 with a flow outlet opening 25, through which blow-by gas can exit the crankcase 15, and an inventive separating device 51 that is fluidically connected to the flow outlet opening 25 and schematically indicated in FIG. 1. It should be clear that an inventive particle separator 53 may also be fluidically coupled to the outlet opening instead of the inventive separating device 51 in order to form an inventive crankcase ventilation system 29. According to FIG. 1, the fluidic connection between the separating device 51 and the flow outlet opening 25 may be realized by means of a pipeline system such as an outlet pipe 135, which fluidically connects the flow outlet opening 25 of the crankcase to the flow passage opening 27 of the separating device 51. In a (not-shown) alternative embodiment, the separating device 51 may be mounted on the crankcase 15 in such a way that the flow passage opening 27 of the separating device 51 corresponds to the flow outlet opening 25 of the crankcase 15.

FIG. 1 furthermore shows an example of the formation of blow-by gas and of the general installation position of separating devices 51 and particle separators 53. This figure shows an internal combustion engine 1 that is fluidically coupled to a fresh air supply 3, an exhaust gas discharge 5 and a crankcase ventilation 7. The internal combustion engine 1 comprises a cylinder head cover 9, a cylinder head 11, a cylinder 13 and a crankcase 15. A piston 17 is guided in the cylinder and separates a swept volume 19 from a crankcase interior 21. Not-shown sealing rings are provided between the piston 17 and the cylinder 13 in order to seal the swept volume 19 relative to the crankcase interior 21. Nevertheless, combustion gases and/or unburnt gases flow from the swept volume 19 into the crankcase interior 21 between the piston 17 and the cylinder 13. The resulting gas flow 23 is also referred to as blow-by gas flow and not only contains air and oil, but also combustion gases and unburnt fuel components.

In order to prevent a pressure increase in the crankcase 15, the gas flow 23 is discharged from the crankcase 15 by means of a crankcase ventilation 7 and fed to the fresh air supply 3. In this case, the crankcase ventilation 7 particularly comprises the fluidic coupling between the flow outlet opening 25 of the crankcase 15 and the flow passage opening 27 of the separating device 51. The separating device 29 furthermore is fluidically connected to the crankcase 15 by means of a return pipe 31 for returning separated particles such as oil. The return pipe 31 fluidically connects, in particular, a return outlet 33 of the separating device 29 to a return inlet 35 on the crankcase 15. Furthermore, a return pipe 37 fluidically connects the separating device 51 to the fresh air supply 3 upstream of the separating device 29 in order to feed a gas flow, from which particles such as oil have been separated, to the fresh air supply 3. The resulting fresh air flow 41 is compressed by means of a compressor wheel 39 and fed to the internal combustion engine 1 through the cylinder head 11 by means of a charge air cooler 43. Combustion gases that do not reach the crankcase 15 between the piston 17 and the cylinder 13 are fed to a turbocharger 47 in the form of exhaust gas 45 by means of an exhaust gas discharge, wherein said turbocharger drives the compressor wheel 39 in the fresh air supply 3 via a shaft 49.

It should be clear that the installation position of the inventive separating device 51 is in an application as an oil separator in internal combustion engines not limited to the installation position illustrated in FIG. 1 and also not limited to the use in a crankcase ventilation system 29. For example, the separating device 51 could also be used for separating particles from gas flows that exit the internal combustion engine 1 between the cylinder 13 and the cylinder head 11 and/or between the cylinder head 11 and the cylinder head cover 9. Another potential field of application can be seen in the fresh air supply 3 and/or in the exhaust gas discharge 5, which particularly may be fluidically coupled to one another by means of the shaft 49 connecting the compressor wheel 39 and the turbine wheel 47.

Figure 3A:
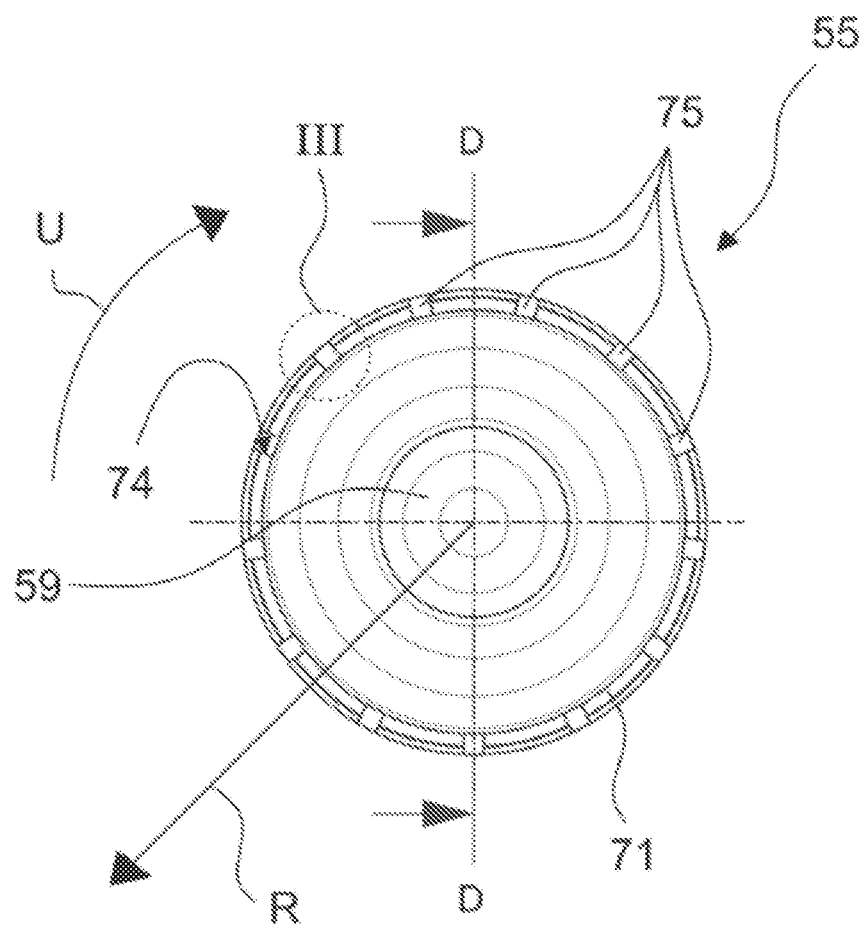
FIG. 3a shows a bottom view of the valve element according to FIG. 2.
Figure 3B:
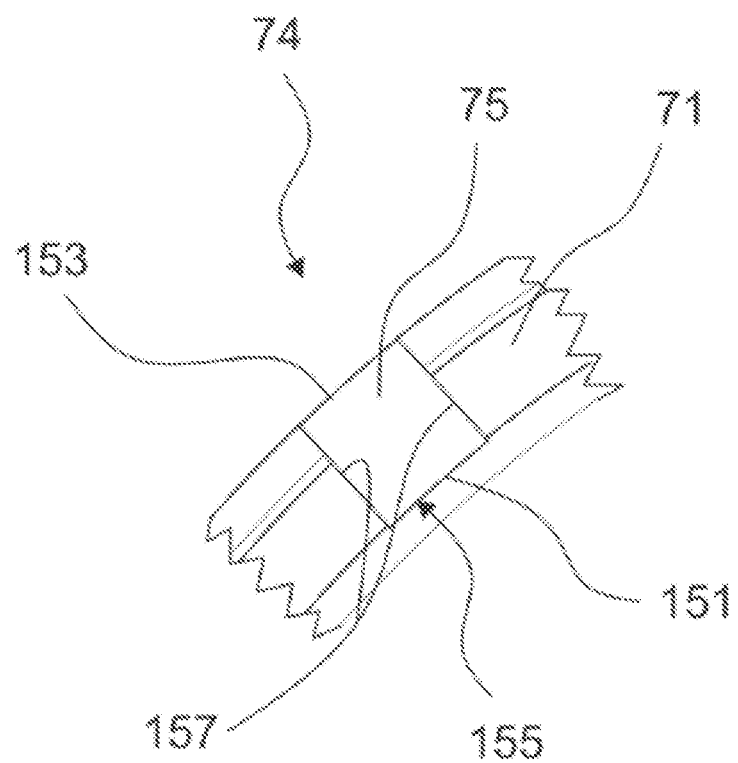
Figure 4:
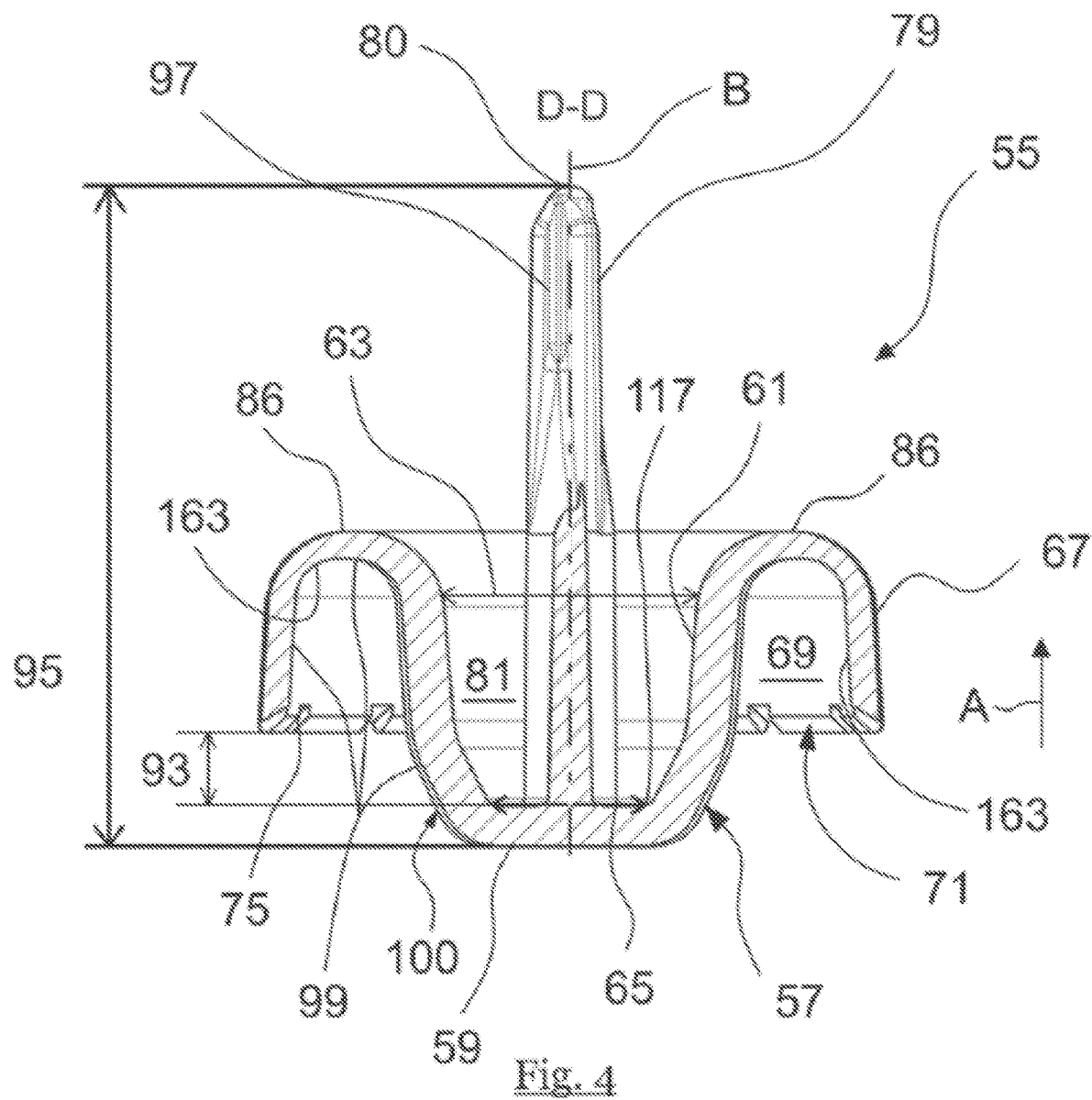

FIGS. 2 to 4 show a first exemplary embodiment of a valve element 55 for an inventive separating device 51 in the form of a side view (FIG. 1), a bottom view (FIG. 3a) and a section along the line of section D-D (FIG. 4). An inventive separating device 51 for separating particles such as oil particles from a gas flow, from a blow-by gas of a crankcase ventilation, in an external combustion engine comprises a valve seat 73 that defines a flow passage opening 109 and a movable valve element 55 that can be displaced between a closed position, in which the valve element 55 is in abutting contact with the valve seat 73, and at least one open position, in which the valve element 55 is moved from the axial abutting point in an axial actuating direction. The axial actuating direction, in which the valve element 55 moves during its displacement from the closed position into the open position, is identified by the reference symbol A below, wherein a closing direction, which extends opposite to the axial actuating direction A and defines a displacement of the valve element 55 into the closed position, is identified by the reference symbol S. A displacement in the closing direction or the actuating direction S, A may generally also be referred to as a displacement in the axial direction. The radial direction extending perpendicular to the actuating direction A is identified by the reference symbol R below. The valve element 55 comprises a bowl 57 with a bowl base 59 that essentially extends in the radial direction R, particularly in a disk-shaped manner. A shell 61 essentially extends from the bowl base 59 in the actuating direction A. The shell 61 and the bowl base 59 form a bowl 57 that is open toward a side 58 in the actuating direction A. The shell 61 is tapered in a closing direction S extending opposite to the actuating direction A and leads into the disk-shaped bowl base 59. The bowl base 59 and the shell 61 are realized rotationally symmetrical, wherein the taper of the shell 61 is limited in such a way that the maximal inside diameter 63 of the shell 61 is no more than 30%, 50%, 70% or 110% greater than the minimal inside diameter 65 of the shell 61.

A valve element collar 67 respectively borders on or leads into the shell 61, particularly the end of the shell 61 pointing in the actuating direction A. The valve element collar 67 is realized rotationally symmetrical and initially extends from the shell 61 essentially in the radial direction R, particularly in an arc-shaped manner, and then essentially in the closing direction S. The valve element collar 67 and the bowl 57, particularly the shell 61, define an annular space 69 of the valve element 55 that is open in the closing direction S.

An end of the collar 67 that points in the closing direction S forms an essentially circumferential abutting contact surface 71 of the valve element 57 for the abutting contact between the valve element 57 and the valve seat 73. An abutting contact between the valve element 55 and the valve seat 73 can be gathered from the separating device 55 illustrated on the left in FIG. 10. A circumferential direction is identified by the reference symbol U below.

According to FIGS. 2 to 9, the abutting contact surface 71 of the valve element 57 and/or an abutting contact surface 77 of the valve seat 73 may be contoured in order to allow a fluid passage in the closed position, i.e. in the abutting contact, of the separating device 51. The contouring of the at least one abutting contact surface 71, which is generally identified by the reference symbol 74, may comprise at least one projection and/or at least one depression. For example, a (not-shown) gap, which at least sectionally extends in the circumferential direction U, is formed between the valve element 55 and the valve seat 73 in the closed position due to this contouring 74. In this case, a gap extent in the circumferential direction U and/or a gap dimension in the axial direction can be realized in dependence on a predefined leakage gas volume flow, which should be allowed in the closed position. In the embodiments shown, the contouring comprises multiple depressions 75 (recesses) on the abutting contact surface 71 of the valve element collar 67. The multiple depressions 75 are circumferentially distributed on the contouring, particularly on the valve seat collar, in an equidistant manner. In the present embodiment, the contouring comprises thirteen depressions 75. However, more or fewer depressions 75 may also be provided. In the examples shown, the depressions 75 are illustrated with an exemplary rectangular cross section. However, they may also have other cross-sectional shapes such as, for example, that of a circle, an ellipse, a triangle, a pentagon, etc. It proved advantageous to incline the depressions 75 downstream in the closing direction S starting from a plane extending in the radial direction R in order to direct the passage taking place through the contouring at the abutting contact surface 77 of the valve seat 73, wherein the separation rate, i.e. the efficiency of the separating device 51, can thereby be increased.

FIG. 3b shows an enlarged detail III of the contouring 74, particularly a depression 75, according to FIG. 3a. This figure shows that the abutting contact surface 71 of the valve element 55 has an inflow edge 151, upon which the gas flow flowing along the valve element 55 initially impinges. The abutting contact surface 71 has a flow outlet edge 153, which lies opposite of the inflow edge 151 and along which the gas flow exits the depression 75. The depression 75 therefore forms a fluid passage channel 155, which extends in the radial direction R and, for example, may have a curved shape or extend essentially straight in the radial direction R as it is the case in FIG. 3b. The flow passage channel 155 serves for separating particles from the gas flow due to the impact of the particles of the gas flow on flow guide surfaces 157, which define the fluid passage channel 155 and therefore can be interpreted as walls of the fluid passage channel 155.

A guide pin 79 extends from the bowl base 59 in order to guide a spring and/or the valve element in the actuating direction A. The guide pin 79 particularly extends along a rotational axis of symmetry of the bowl 57 and/or the collar 67, which is identified the reference symbol B, and beyond the collar 67 and the bowl 57 in the actuating direction A. In the closing direction S extending opposite to the actuating direction A, the guide pin 79 extends beyond the abutting contact surface 71 of the valve element 55, particularly the valve element collar 71. The guide pin 79 and the bowl 57, particularly the shell 61, define an annular space 81 that is open in the actuating direction A and particularly becomes larger in the actuating direction A. According to FIG. 10, the annular space 81 between the guide pin 79 and the bowl 57 not only serves for the particle separation, but also for accommodating a spring 83 that is supported on the bowl 57, particularly on the bowl base 59, and causes a displacement in the closing direction S.

The rotationally symmetrical bowl base 59 axially protrudes past the abutting point opposite to the axial actuating direction A, i.e. in the closing direction S, by at least 5 mm, particularly by at least 10 mm, such as by at least 10%, 20%, 30%, 40% or 50% of the longitudinal extent of the valve element. The abutting point particularly is defined by the common abutting contact surfaces 71, 77 of the valve seat 73 and the valve element 55 in the closed position. The bowl base 59 serves as a supporting point 117 for the spring 83, which is supported on the valve element 55 with an axial end 84 in the closing direction S and on the housing 110, particularly on the cover part 113 of the housing 110, with the other axial end 82 in the actuating direction A. Since the bowl base 59 axially protrudes past the abutting point, particularly the abutting contact surface 71 of the valve element 73, in the closing direction S, the supporting point 117 of the spring 82 may likewise protrude past the abutting point in the closing direction S. The available spring travel can thereby be increased without increasing the overall extent of the separating device 51 in the actuating direction A. In this way, the overall axial extent of the separating device 51 required for the desired actuating travel particularly is partially shifted in the closing direction S for the benefit of the axial extent in the actuating direction A.

FIGS. 5 to 7 show a second exemplary embodiment of a valve element 55 for an inventive separating device 51 in the form of a side view (FIG. 5), a bottom view (FIG. 6) and a section along the line of section E-E (FIG. 7). Corresponding characteristics are identified by the same reference symbols in order to improve the readability of the application. At least one leakage element 85 is formed in the valve element 55 in this second embodiment of the valve element 55 of an inventive separating device 51. The leakage element 85 may be provided alternatively or additionally to the contouring 74. The leakage element 85, as well as the contouring 74, serves for allowing a fluid passage in the closed position of the valve element 55 relative to the valve seat 73 in order to also achieve a separation effect of the separating device 51 in the closed position.

According to the exemplary drawings, the valve element 55 comprises the contouring 74, as well as the leakage element 85. As an example, four leakage elements 85 are formed in the valve element 55 according to the second embodiment as illustrated, in particular, in FIG. 6. The leakage elements 85 are realized in the form of through-bores that are tapered in the actuating direction A. Due to this taper, the gas flow is accelerated during its passage through the leakage elements 85 such that the separation of particles is promoted. In alternative embodiments, the leakage elements 85 could also be realized in the form of bores that widen in the actuating direction A or in the form of bores with constant cross section. It is likewise not mandatory that the bores have the round shape shown. The bores could also have an elliptical shape or be realized angularly. The leakage elements 85 are located in a reversal section 86 of the bowl 57, which protrudes farthest in the actuating direction A and into which the shell 61 and the collar 67 lead, and essentially extend in the actuating direction A. Leakage elements 85 may alternatively or additionally be formed, for example, in the shell 61 and essentially extend in the radial direction R (in a not-shown manner) or formed in the bowl base 59 and essentially extend in the actuating direction A (in a not-shown manner).

In order to additionally increase the separation rate of separating devices, the inventive separating device 51 may comprise a fibrous web 87, which is arranged on the separating device 51 in such a way that the gas flow impinges upon and/or flows through the fibrous web 87. When a fibrous web 87 is used as illustrated, for example, in FIGS. 11 and 12, it proved advantageous to provide a ring 89 on the end of the collar 67 or the shell 61 in the actuating direction A, wherein the inside diameter 91 of said ring is greater than or equal to the maximal inside diameter 63 of the shell 61. In this case, the leakage elements 85 extend through the collar 67 and the ring 89 in the actuating direction A. It proved advantageous to provide between two and ten leakage elements 85, between two and eight leakage elements, particularly between two and six leakage elements, in the actuating element 57, wherein said leakage elements particularly are arranged equidistant from one another in the circumferential direction U.

An axial extent 93 between the abutting surface 71 of the valve element 57 and the bowl base 59 in the actuating direction A of the guide pin 79 can be adapted in relation to an overall axial extent 95 in the actuating direction A of the valve element 55, particularly shifted in the closing direction S extending opposite to the actuating direction A, in order to reduce the required structural space in the actuating direction A. It proved advantageous to realize an axial extent 93 of the guide pin 79 between the abutting surface 71 of the valve element 57 and the bowl base 59 such that it corresponds to at least 10%, 20%, 30%, 40% or 50% of the overall axial extent 95 of the valve element 55. The axial extent 93 of the guide pin 79 between the abutting surface 71 of the valve element 57 and the bowl base 59 amounts to approximately 12.5% of the overall axial extent of the valve element 57 in the embodiment according to FIGS. 2 to 4 and to approximately 20% in the embodiment according to FIGS. 5 to 7. In this way, the axial extent of the valve element and the separating device, into which the valve element is inserted, can be shifted in the closing direction S in order to thereby reduce the axial extent in the actuating direction A. According to FIG. 7, the guide pin 79 is tapered in the actuating direction A. The taper begins approximately at the axial height of the valve element collar 67 and extends over a short section in the actuating direction A, e.g. over approximately 10% of the overall axial extent 95 of the guide pin 79, wherein the guide pin 79 then continues to extend in the actuating direction A with constant cross section. Viewed in the actuating direction A, at least one guide lug 97 particularly extends in the radial direction R on an upper end 80 of the guide pin 79 in the actuating direction A, wherein multiple guide lugs 97 are provided as an example and essentially distributed on the guide pin 79 in the circumferential direction U. The guide lugs 97 particularly serve for guiding the guide pin 79, in a housing of the separating device 51, wherein the guide lugs 97 particularly may engage into (not-shown) guide grooves provided for this purpose.

The valve elements 55 illustrated in FIGS. 2 to 10 comprise flow guide surfaces 99 for deflecting the gas flow such that particles are separated from the gas flow due to the impact of the particles on the flow guide surfaces 99. In this context, the surfaces of the valve element 55, which come in contact with the gas flow and deflect and/or guide this gas flow, are referred to as flow guide surfaces 99. The flow guide surfaces 99 particularly are formed on an outer surface 100 of the valve element 55, which faces away from the axial actuating direction A. The flow guide surfaces 99 are formed by the bowl 57, particularly the shell 61, and the valve element collar 67. The flow guide surfaces 99 of the valve element 55 define the annular space 69, which is open in the closing direction S, such that a gas flow flowing toward the valve element 55 in the actuating direction A is deflected and/or guided.

Figure 8:
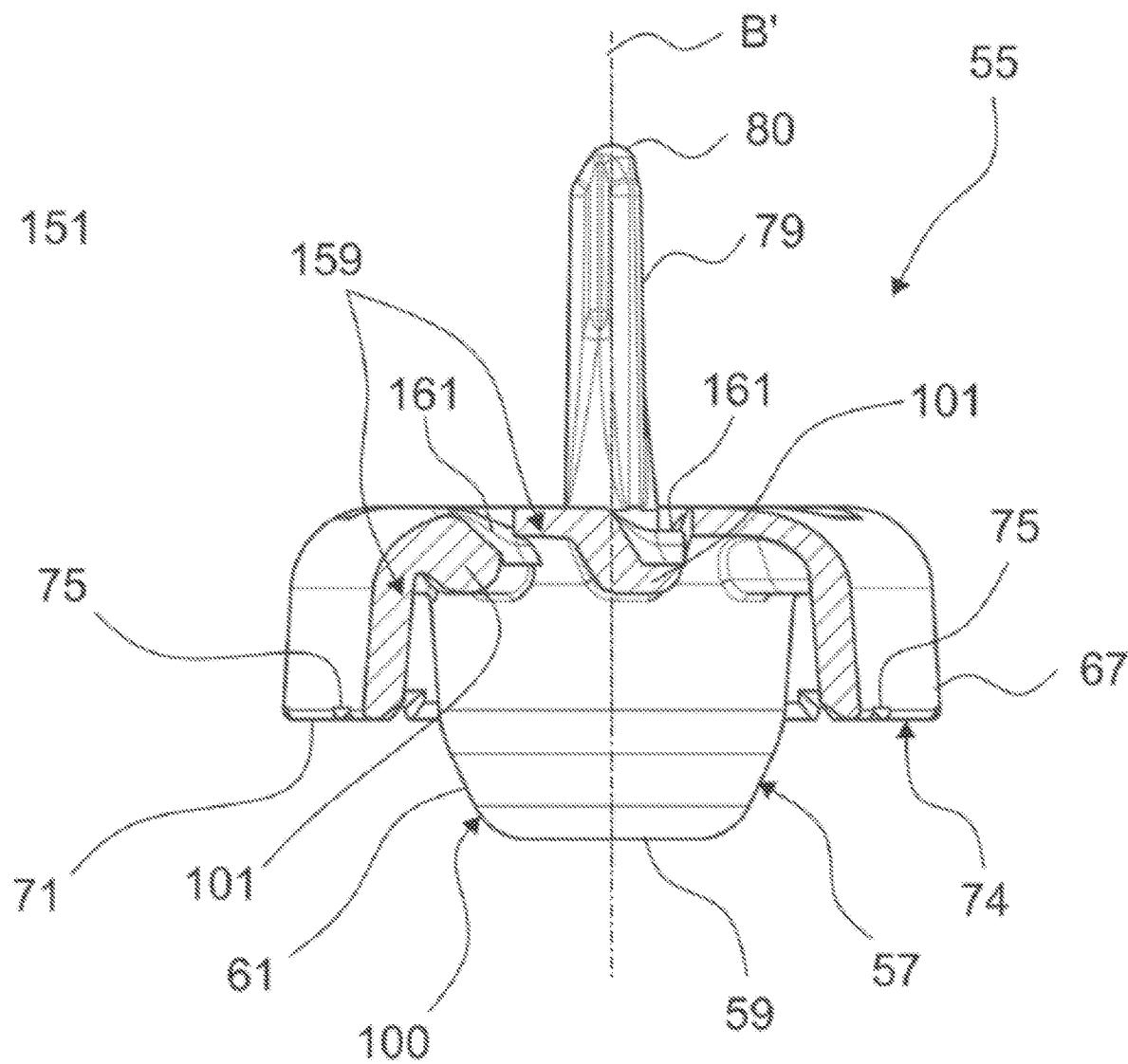
FIG. 8 shows a partially sectioned side view of a third embodiment of a valve element for a separating device.
Figure 9:
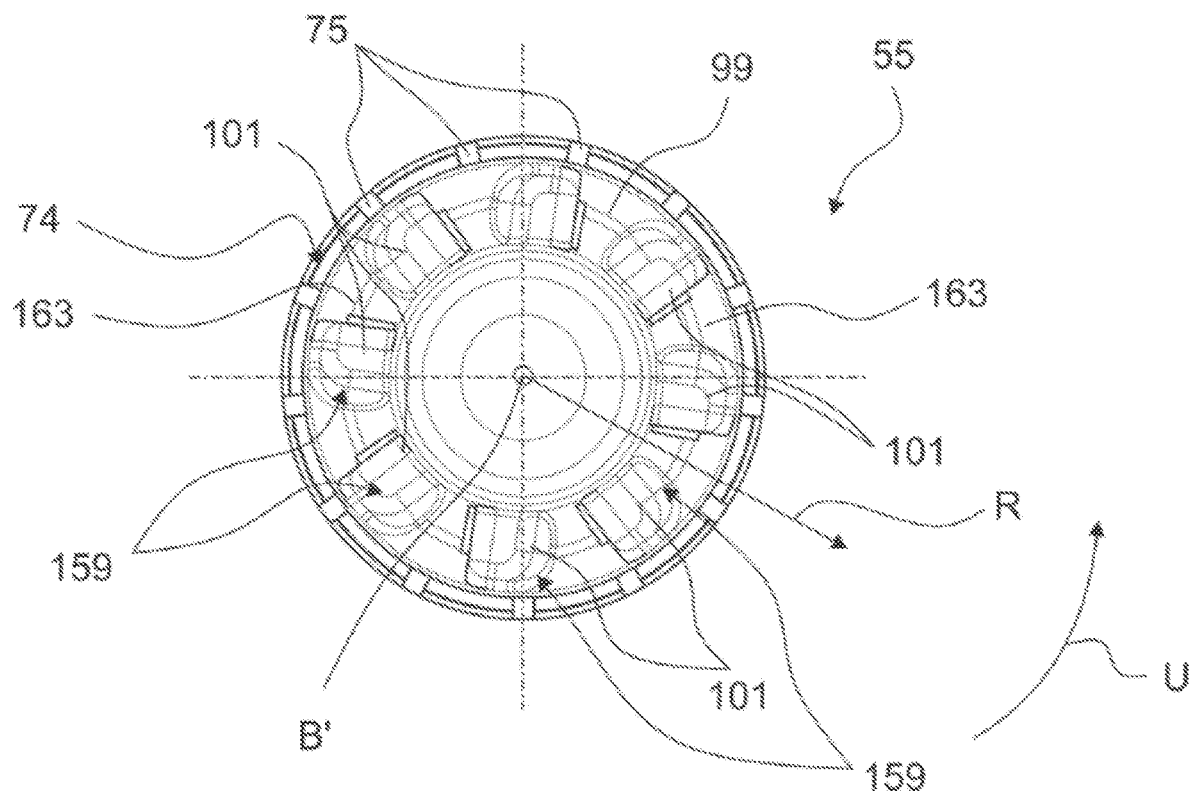
FIG. 9 shows a bottom view of the valve element according to FIG. 8.

FIGS. 8 to 9 show an exemplary embodiment of a valve element 55 for an inventive separating device 51 in the form of a side view (FIG. 8) and a bottom view (FIG. 9), wherein fluid passage elements 159 are provided in this embodiment in order to allow a fluid passage in the closed position. In this context, it should be clear that the fluid passage elements 159 illustrated in FIGS. 8 and 9 may be provided additionally or alternatively to the leakage elements 85 or the contouring 74, respectively. Corresponding characteristics are identified by the same reference symbols in order to improve the readability of the application.

The fluid passage elements 159 are arranged on the flow guide surfaces 99 of the valve element 55. The fluid passage elements 159 are arranged in such a way that fluid passage openings 161, through which a fluid passage can be realized in the closed position, are formed on the flow guide surfaces 99. For example, the fluid passage elements 159 may be realized in the form of turbine blade-like guide projections 101 and/or in the form of turbine blade-like guide depressions, which also transform the gas flow into a swirling flow in order to increase the separation rate of the separating device 51. According to the embodiment illustrated in FIGS. 8 to 9, multiple guide projections 101 are provided in order to improve the effect thereof. The turbine blade-like guide projections 11 are arranged on an inner valve element collar surface 163 referred to the radial direction R. It is furthermore possible to arrange additional or alternative guide projections 101 and/or guide depressions on flow guide surfaces of the valve seat 73 (in a not-shown manner) in order to additionally increase the separation rate.

According to the exemplary embodiment, the guide projections 101 are shaped in a helical manner such that the fluid passage openings 161 are formed. In this case, the guide projections 101 particularly are realized in the form of material webs that continuously extend about a rotational axis B' of the valve element 55 in a helical manner, wherein the guide projections 101 are respectively tied to the flow guide surfaces 99 or the inner valve element collar surface 163 in such a way that the fluid passage openings 161 remain clear in order to allow a fluid passage.

Figure 10:
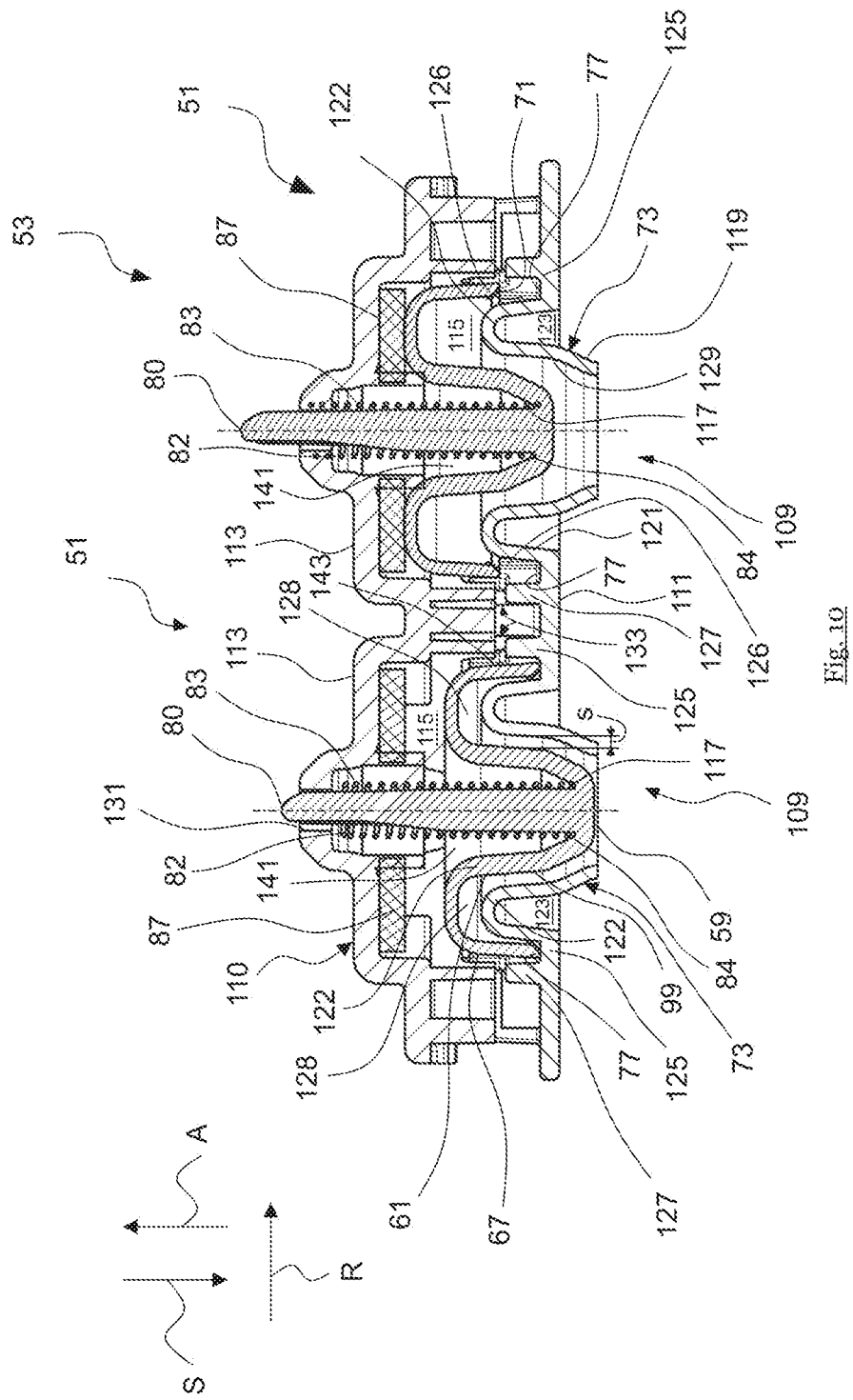
FIG. 10 shows a sectional view of a first embodiment of a particle separator with two separating devices, wherein the left separating device is illustrated in the closed position and the right separating device is illustrated in the open position.

FIG. 10 shows an exemplary embodiment of an inventive particle separator, which in this example comprises two inventive separating devices 51 that are fluidically connected to one another, wherein the left separating device 51 is illustrated in the closed position and the right separating device 51 is illustrated in the open position. The valve elements 55 of the separating devices 51 illustrated in FIG. 10 approximate the valve element 55 illustrated in FIGS. 2 to 4 and particularly can be distinguished by a larger annular space 69 between the valve element collar 67 and the bowl 57.

The separating devices 51 of the particle separator 53 are arranged parallel to one another and fluidically connected to one another. In this context, the term arranged parallel to one another refers to the separating devices 51 being arranged in such a way that a gas flow impinging upon the particle separator 53 can simultaneously flow into both separating devices 51 or be divided between the two separating devices 51, respectively. Each separating device 51 has a flow passage opening 109, by means of which a gas flow impinging upon the particle separator 53 can be divided between both separating devices 51. Although FIG. 10 merely shows the coupling of two separating devices 51 in the form of a particle separator 53, it should be clear that the preceding and following description of the separating devices 51 applies to a particle separator 53 with two separating devices 51, as well as to an individual separating device 53 and to a particle separator 53 with more than two parallel separating devices 51.

The separating device 51 particularly comprises a two-part housing 110. The housing comprises an inflow housing part 111 and a cover part 113 that respectively is or can be connected thereto. The inflow housing part 111 and the cover part 113 particularly may be separably connected to one another by means of a (not-shown) clip connection. The inflow housing part 111 particularly may be connected to the crankcase by means of a (not-shown) tongue-and-groove connection. In one embodiment, the inflow housing part 111 can be connected to the crankcase by means of a tongue-and-groove connection. The separating device 51 comprises a valve seat 73 that defines the flow passage opening 109. The valve seat 73 forms part of the housing 110, particularly the inflow housing part 111. The valve seat 73 and the inflow housing part 111 are made of one piece. In the particle separator 53 shown, the valve seats 73 of the two separating devices 51 and the inflow housing parts 111 are made of one piece. The cover parts 113 of the two separating devices 51 are likewise made of one piece. For example, die casting methods may be used for this purpose.

The housing 110 defines a separation space 115 for separating particles from the gas flow and for accommodating and guiding the valve element 55. The valve element 55 is mounted in the separation space 115. In the closed position, the valve element 55 is in abutting contact with the valve seat 73. During this abutting contact, the abutting contact surface 71 of the valve element 55 and the abutting contact surface 77 of the valve seat 73 contact one another. In this case, the valve element 55 is pressed against the valve seat 73 by means of a spring 83 that is supported on the valve element 55 with an axial end 84. An axial end 82 of the spring 83 lying opposite of the axial end 84 is supported on the cover part 113 of the housing. When the valve element 55 is acted upon by a gas flow with sufficient pressure, it is moved from the closed position into an open position in the actuating direction A. In this case, the gas flow acts against the spring force of the spring 83, wherein it would also be possible, for example, to provide a multi-spring arrangement such as a serial arrangement of at least two springs 83. The spring 83 supported between the valve element 55 and the housing cover 113 is compressed during a displacement of the valve element 55 in the actuating direction A. The spring force acting against the displacement motions of the valve element 55 increases as the displacement of the valve element 55 progresses in the actuating direction A. The spring characteristic can be adapted to a desired response characteristic of the valve element 55 by using springs with progressively coiled spring characteristic and/or by using a serial arrangement of multiple springs.

The spring 83 is placed over the guide pin 79 that extends from the bowl 57, particularly from the bowl base 59, in the actuating direction A. A passage opening 131 for the guide pin 79, into or through which the guide pin 79 respectively protrudes, is provided in a part of the housing, particularly the cover part 113, which lies opposite of the bowl base 59 in the actuating direction A. The passage opening 131 is dimensioned in such a way that it guides the valve element 55 during a displacement in the actuating direction and/or the closing direction A, S.

The space requirement of the spring 83, particularly in the actuating direction A, is reduced in that the spring 83 is supported on the bowl 57, especially on the bowl base 59, wherein a supporting point 117 is viewed in the actuating direction A formed at a lowest point on a bowl side pointing in the actuating direction A. The space requirement for the spring 83 is alternatively or additionally reduced in that the supporting point 117 of the spring 83 and/or the bowl base 59 axially protrudes past the abutting point 71, 77 opposite to the actuating direction A in the closed position of the valve element 55. In this way, the overall extent of the separating device 51 required for the actuating travel of the spring 83 particularly can be partially shifted in the closing direction S in favor of the extent in the actuating direction A. This also makes it possible, in particular, to reduce the overall axial extent of an arrangement, particularly a crankcase ventilation system 29, which comprises a separating device 51 and a gas flow source that is connected to the separating device 51 upstream and particularly may be realized in the form of a crankcase, from which blow-by gas flows into the separating device. In this case, the invention utilizes the fact that the extent, which is shifted in the closing direction S in favor of the axial extent in the actuating direction A, protrudes into an already available structural space of the gas flow source such that the actuating travel of the spring 83 can be increased without reducing the overall axial extent of the arrangement.

The valve seat 73 is realized rotationally symmetrical. The valve seat 73 particularly comprises a hollow body 119 that is shaped complementary to the bowl 57 of the valve element 55. The bowl 57 and/or the hollow body 119 is tapered in the closing direction S. In this case, the bowl 57 and the hollow body 119 particularly are shaped complementary to one another. The bowl 59 can be telescopically displaced inside the hollow body 119 in order to displace the valve element 55 into the closed position and/or open position. Due to the complementary design of the bowl 57 and the hollow body 119, the valve element 55 is guided in the actuating/closing direction A, S by the valve seat 73, particularly the hollow body 119, during a displacement in the actuating direction and the closing direction A, S. It should be clear that a certain relative motion of the guided valve element 55 is possible in a direction extending transverse, especially perpendicular, to the actuating/closing direction A, S. In fact, the term guided respectively refers to the motion of the guided part, i.e. the valve element 55, at least being restricted in other directions or to centering of the part, i.e. the valve element 55, taking place due to the guidance.

According to FIG. 10, a clearance s in the radial direction R exists between the bowl 57 and the hollow body 119 of the separating device 51 (illustrated on the right) in the present arrangement such that the guidance of the hollow body 119 allows a certain motion in the radial direction R. In contrast, a significantly smaller gap exists between the bowl 57 and the hollow body 119 of the separating device 51 (illustrated on the left) in FIG. 10 in the closed position.

The valve seat 73 furthermore comprises a valve seat collar 121 that leads into the hollow body 119. In this case, the valve seat collar 121 initially extends in the radial direction A in an arc-shaped manner from an end 122 of the hollow body 19 in the actuating direction A and then essentially in the closing direction S. The hollow body 119 and the valve seat collar 121 define an annular space 123 that is open in the closing direction S. The hollow body 119 and the valve seat collar 121 protrude into the annular space 115 defined by the valve element 55. In the closed position, the hollow body 119 and the valve seat collar 121 particularly are enclosed by the valve element 55 in the radial direction R.

The axial abutting point 77 (abutting contact surface of the valve seat 73) is formed by a radial web 125, into which the valve seat collar 121 leads. An axial web 127, which essentially extends in the actuating direction and the closing direction A, S, borders on the radial web 125 in the radial direction R. The valve seat collar 121, the radial web 125 and the axial web 127 define an annular gap 126 that is open in the actuating direction A and particularly guides the valve element 55 during a displacement in the actuating direction and in the closing direction S.

The valve elements 55 and valve seats 73 illustrated in FIG. 10 are realized in a collar-shaped manner and particularly can be telescopically displaced inside one another such that a collar-shaped gap 128 is formed between the valve element 55 and the valve seat 73, particularly in the closed position. The collar-shaped gap 128 particularly is formed between flow guide surfaces 129 of the valve seat 73 and flow guide surfaces 99 of the valve element 55. The flow guide surfaces 129 of the valve seat 73 particularly are formed by the inner surfaces of the hollow body 119 referred to the radial direction R, which come in contact with the gas flow, and by the outer surface of the valve seat collar 121 referred to the radial direction R. The collar-shaped gap 128 causes a deflection of the gas flow by at least 130°, 140°, 150°, 160°, 170° or 180°, wherein the gas flow flows between the flow guide surfaces 99, 129 of the valve element 55 and the valve seat 73.

The valve element 55 divides the separation space 115 defined by the housing 110 into a flow space between the valve element 55 and the valve seat 73 and a bypass space 141 between the valve element 55 and the cover part 113. The gas flow flows through the flow space along the flow guide surfaces 99, 129 between the valve seat 73 and the valve element 55. The gas flow can even reach the bypass space 141, in which particles can also be separated, in the closed position of the valve element 55 through the leakage elements 85, the contouring 74 or the fluid passage elements 159 in the valve element 55. Due to the contouring 74, the leakage elements 85 or the fluid passage elements 159 of the abutting surfaces 71, 77, a gas flow can also flow from one separating device 51 into the other separating device and vise versa in the closed position of both valve elements 55.

In FIG. 10, a fibrous web 87 is provided in the bypass space 141, wherein particles can be separated on said fibrous web. In this case, the gas flow does not have to flow through the fibrous web 87. It suffices if the gas flow impinges upon the fibrous web 87 in order to separate particles thereon. The fibrous web 87 is realized in a disk-shaped manner, particularly annularly, and fastened on the cover part 113 of the housing 110.

A separating nozzle 133 with constant through-flow cross section is arranged downstream of the valve element 55 for the nebulization and/or defined discharge of the gas flow. The separating nozzle particularly forms at least one gap between the housing cover 113 and the inflow housing part 111 in the installed state. Since the housing cover 113 and the inflow housing part 111 essentially are fastened to one another in an immovable manner, the cross section of the gap and therefore the through-flow cross section of the separating nozzle 133 essentially remain constant regardless of the position of the valve element 55. Due to this constant through-flow cross section, a minimal particle separation by means of the at least one separating nozzle 133 can also be ensured when the valve element 55 is completely opened. The separating nozzle 133 is arranged downstream of the abutting contact between the valve element 55 and the valve seat 73. An annular gap between the abutting contact surface 71 of the valve element 55 and the abutting contact surface 77 of the valve seat 73 is formed in the maximal open position. The through-flow cross section of this annular gap, particularly a clearance between the abutting contact surfaces 71, 77 of the valve element 55 and the valve seat 73 in the actuating direction A, is greater, especially at least 20%, 40%, 60%, 80% or 100% greater, than the maximal through-flow cross section of the separating nozzle 133, particularly than the axial extent of the gap between the housing cover 113 and the inflow housing part 111.

According to FIG. 10, at least two separating devices 51 can be fluidically connected to one another into a particle separator 53 in such a way that a gas flow can flow from one separating device 51 into the other separating device 51. The separating devices 51 particularly are fluidically connected to one another downstream of the separating nozzle 133. An exemplary embodiment of such a fluidic connection is illustrated in FIG. 10. In this case, a gas flow can exit the separation space 115 of one separating device 51 through its separating nozzle 133 and enter the separation space 115 of the other separating device 51 through its separating nozzle 133. A separation space connecting gap 143 is provided between the valve element 55 and the separating nozzle 133, particularly between the separating nozzle 133 and the valve element collar 67, wherein the gas flow can flow from the flow space into the bypass space 141 and vise versa through said connecting gap.

The characteristics disclosed in the preceding description, the figures and the claims may be important for realizing the different embodiments of the invention individually, as well as in various combinations.

REFERENCE LIST

1 Internal combustion engine
3 Fresh air supply
5 Exhaust gas discharge
7 Crankcase ventilation
9 Cylinder head cover
11 Cylinder head
13 Cylinder
15 Crankcase
17 Piston
19 Swept volume
21 Crankcase interior
23 Gas flow
25 Flow outlet opening
27 Flow passage opening
29 Crankcase ventilation system
31 Return pipe
33 Return outlet
35 Return inlet
37 Return pipe
39 Compressor wheel
41 Fresh air flow
43 Charge air cooler
45 Exhaust gas
47 Turbocharger
49 Shaft
51 Separating device
53 Particle separator
55 Valve element
57 Bowl
58 Bowl side
59 Bowl base
61 Shell
63 Maximal inside diameter of shell
65 Minimal inside diameter of shell
67 Valve element collar
69 Annular space between bowl and valve element collar
71 Abutting contact surface of valve element
73 Valve seat
74 Contouring
75 Contouring depression
77 Abutting contact surface of valve seat
79 Guide pin
80 End
81 Annular space between guide pin and bowl
83 Spring
82, 84 Axial end
85 Leakage element
86 Reversal section
87 Fibrous web
89 Ring
91 Inside diameter of ring
93 Axial extent of guide pin
95 Overall axial extent of valve element
97 Guide lug
99 Flow guide surface of valve element
100 Outer surface
101 Guide projection
109 Flow passage opening
110 Housing
111 Inflow housing part
113 Cover part
115 Separation space
117 Supporting point of spring on valve element
119 Hollow body
121 Valve seat collar
122 End
123 Annular space
125 Radial web
126 Annular gap
127 Axial web
128 Gap
129 Flow guide surfaces of valve seat
131 Passage opening for guide pin
133 Separating nozzle
135 Outlet pipe
137 Gap
139 Gap
141 Bypass space
143 Separation space connecting gap
151 Inflow edge
153 Flow outlet edge
155 Fluid passage channel
157 Flow guide surface
159 Fluid passage element
161 Fluid passage opening
163 Inner valve collar surface
A Actuating direction
S Closing direction
R Radial direction
U Circumferential direction
B Rotational axis of symmetry
B' Rotational axis
s Clearance

The invention claimed is:

1. A device for separating particles from a gas flow with a blow-by gas of a crankcase ventilation in an internal combustion engine, the device comprising:
 a valve seat that defines a flow passage opening;
 a movable valve element that is displaceable between a closed position, in which the valve element is in abutting contact with the valve seat and the abutting contact defines an axial abutting point, and at least one open position, in which the valve element is moved from the axial abutting point in an axial actuating direction (A); and
 at least one leakage element configured to allow a fluid passage in the closed position;
 wherein the valve element has upstream of the gas flow a rotationally symmetrical bowl, which axially protrudes past the valve seat opposite to the axial actuating direction (A) by at least 10% of the longitudinal extent of the valve element.

2. The device according to claim 1, further comprising a spring, wherein the spring comprises a coil spring configured to pretension the valve element into the closed position in the axial direction, further wherein the spring is supported on the valve element and causes a displacement of the valve element into the closed position.

3. The device according to claim 2, wherein a spring constant is based on a fluid passage surface, which is oriented perpendicular to the axial actuating direction (A), and is dimensioned with respect to an overall inflow surface of the valve element, so that a fluid passage volume up to 60 l/min, is ensured in the closed position before the valve element is displaced from the closed position in the axial actuating direction (A).

4. The device according to claim 3, wherein an additional spring is arranged in series with the spring in the axial actuating direction, wherein the upstream spring near the valve element has a lower spring constant than the downstream spring, further wherein the spring near the valve element is supported on the valve element and the downstream spring is supported on the spring near the valve element.

5. The device according to claim 3, wherein the spring has a progressive spring constant.

6. The device according to claim 1, further comprising at least one separating nozzle with constant through-flow cross section downstream of the valve element configured to nebulize or define a discharge of the gas flow, wherein a flow cross section between the valve element and the valve seat at the abutting point amounts to 90% to 200% of a through-flow cross section of the separating nozzle in an open position.

7. The device according to claim 1, wherein the at least one leakage element is arranged on a base of the bowl that extends perpendicular to the axial actuating direction (A).

8. The device according to claim 7, wherein the at least one leakage element is configured so that a fluid return of separated particles, is through the at least one leakage element opposite to the axial actuating direction (A).

9. The device according to claim 7, wherein the at least one leakage element comprises a leakage projection or a leakage depression.

10. The device according to claim 1, wherein the bowl comprises a bowl base that protrudes past the abutting point opposite to the axial actuating direction.

11. A particle separator with at least two devices for separating particles from a gas flow with a blow-by gas of a crankcase ventilation in an internal combustion engine, wherein the at least two devices comprise:
a valve seat that defines a flow passage opening; and
a movable valve element;
wherein the at least two devices are fluidically connected to one another so that a gas flow can be divided between the two devices upstream of the particle separator and a gas flow can flow from one device into the other device.

12. A crankcase ventilation system of an internal combustion engine, comprising:
a crankcase with a flow outlet opening, through which blow-by gas can exit the crankcase; and
a device configured to separate particles from the blow-by gas, which is fluidically connected to the flow outlet opening, the device comprising:
a valve seat that defines a flow passage opening; and
a valve element that is displaceable between a closed position, in which the valve element is in abutting contact with the valve seat and the abutting contact defines an axial abutting point, and at least one open position, in which the valve element is moved from the axial abutting point in an axial actuating direction (A), wherein:
(i) the device further includes at least one leakage element configured to allow a fluid passage in the closed position, wherein the valve element has upstream of the gas flow a rotationally symmetrical bowl, which axially protrudes past the valve seat opposite to the axial actuating direction (A) by at least 10% of the longitudinal extent of the valve element;
(ii) the device further includes at least one separating nozzle with constant through-flow cross section downstream of the valve element configured to nebulize or define a discharge of the gas flow, wherein a flow cross section between the valve element and the valve seat at the abutting point amounts to 90% to 200% of a through-flow cross section of the separating nozzle in an open position, at least one abutting contact surface of the valve element and/or the valve seat being contoured to allow a fluid passage in the dosed position; and/or
(iii) at least one abutting contact surface of the valve element and/or the valve seat is contoured to allow a fluid passage in the closed position, the at least one abutting contact surface including an inflow edge and a flow outlet edge and a fluid passage channel extends from the inflow edge to the flow outlet edge in a curved manner in order to deflect the gas flow so that particles separate from the gas flow due to the impact of the particles on flow guide surfaces of the fluid passage channel, wherein the fluid passage channel is formed by the contouring, and wherein the contouring includes at least one depression.

13. A device for separating particles from a gas flow in an internal combustion engine, the device comprising:
a valve seat that defines a flow passage opening; and
a valve element that is displaceable between a closed position, in which the valve element is in abutting contact with the valve seat and the abutting contact defines an axial abutting point, and at least one open position, in which the valve element is moved from the axial abutting point in an axial actuating direction (A), wherein at least one abutting contact surface of the valve element and/or the valve seat is contoured to allow a fluid passage in the closed position, the at least one abutting contact surface including an inflow edge and a flow outlet edge and a fluid passage channel extends from the inflow edge to the flow outlet edge in a curved manner in order to deflect the gas flow so that particles separate from the gas flow due to the impact of the particles on flow guide surfaces of the fluid passage channel, wherein the fluid passage channel is formed by the contouring, and wherein the contouring includes at least one depression.

14. The device according to claim 13, further comprising at least one separating nozzle with constant through-flow cross section downstream of the valve element configured to nebulize and/or define a discharge of the gas flow, wherein a flow cross section between the valve element and the valve seat at the abutting point amounts to 90% to 200% of a through-flow cross section of the separating nozzle in an open position.

15. The device according to claim 13, further comprising a spring, wherein the spring comprises a coil spring configured to pretension the valve element into the closed position in the axial direction, further wherein the spring is supported on the valve element and causes a displacement of the valve element into the closed position.

16. The device according to claim 13, wherein the at least one depression is realized linearly and oriented substantially perpendicular to the axial direction, wherein a group of multiple depressions is arranged on the at least one abutting contact surface of the valve element or the valve seat in a uniformly distributed manner in a circumferential direction (U) with respect to the axial actuating direction (A).

17. A device for separating particles from a gas flow in an internal combustion engine, the device comprising:

a valve seat that defines a flow passage opening;

a valve element that is displaceable between a closed position, in which the valve element is in abutting contact with the valve seat and the abutting contact defines an axial abutting point, and at least one open position, in which the valve element is moved from the axial abutting point in an axial actuating direction (A); and at least one separating nozzle with constant through-flow cross section downstream of the valve element configured to nebulize or define a discharge of the gas flow, wherein a flow cross section between the valve element and the valve seat at the abutting point amounts to 90% to 200% of a through-flow cross section of the separating nozzle in an open position;

wherein at least one abutting contact surface of the valve element and/or the valve seat is contoured to allow a fluid passage in the closed position.

18. The device according to claim 17, wherein the contouring of the at least one abutting contact surface of the valve element and/or the valve seat comprises at least one projection or at least one depression, wherein the at least one projection or the at least one depression is realized linearly and oriented substantially perpendicular to the axial direction, wherein a group of multiple projections or a group of multiple depressions is arranged on the at least one abutting contact surface of the valve element or the valve seat in a uniformly distributed manner in the circumferential direction (U) with respect to the axial actuating direction (A).

19. The device according to claim 18, wherein the at least one abutting contact surface comprises an inflow edge and a flow outlet edge, further wherein a fluid passage channel extending from the inflow edge to the flow outlet edge is realized in a curved manner in order to deflect the gas flow so that particles separate from the gas flow due to the impact of the particles on flow guide surfaces of the fluid passage channel.

20. The device of claim 17, wherein the at least one abutting contact surface comprises an inflow edge and a flow outlet edge, further wherein a fluid passage channel extending from the inflow edge to the flow outlet edge is realized in a curved manner in order to deflect the gas flow so that particles separate from the gas flow due to the impact of the particles on flow guide surfaces of the fluid passage channel.

21. The device according to claim 17, further comprising a spring, wherein the spring comprises a coil spring configured to pretension the valve element into the closed position in the axial direction, further wherein the spring is supported on the valve element and causes a displacement of the valve element into the closed position.

* * * * *